(12) United States Patent
Abughazaleh

(10) Patent No.: US 8,689,533 B2
(45) Date of Patent: Apr. 8, 2014

(54) LAWN RAKE ATTACHMENT AND LAWN RAKE FOR SMALL DEBRIS

(76) Inventor: Firas Najeh Abughazaleh, Austin, TX (US)

( * ) Notice: Subject to any disclaimer, the term of this patent is extended or adjusted under 35 U.S.C. 154(b) by 14 days.

(21) Appl. No.: 13/046,586

(22) Filed: Mar. 11, 2011

(65) Prior Publication Data

US 2011/0219740 A1 Sep. 15, 2011

Related U.S. Application Data

(60) Provisional application No. 61/313,550, filed on Mar. 12, 2010.

(51) Int. Cl.
*A01D 7/00* (2006.01)

(52) U.S. Cl.
USPC .................................... 56/400.11; 56/400.04

(58) Field of Classification Search
USPC ............... 56/400.01, 400.04, 400.06, 400.07, 56/400.11–400.13
See application file for complete search history.

(56) References Cited

U.S. PATENT DOCUMENTS

| | | | |
|---|---|---|---|
| 882,467 A * | 3/1908 | Hubbell ..................... | 56/400.11 |
| 1,105,815 A * | 8/1914 | Milleman .................. | 56/400.06 |
| 1,209,060 A * | 12/1916 | Snyder ...................... | 56/400.11 |
| 1,318,079 A | 10/1919 | Hoag | |
| 1,439,964 A * | 12/1922 | Key .......................... | 56/400.04 |
| 1,509,369 A | 9/1924 | McKesson | |
| 2,065,830 A | 12/1936 | Sherman | |
| 2,099,053 A | 11/1937 | Donnan | |
| 2,770,090 A | 11/1956 | Borden | |
| 3,084,498 A * | 4/1963 | Straley ....................... | 56/400.04 |
| 3,264,810 A | 8/1966 | Lowell | |
| 3,688,483 A * | 9/1972 | Hamilton ................... | 56/400.11 |
| 3,724,188 A | 4/1973 | Eads | |
| 3,979,146 A * | 9/1976 | Berg ............................. | 209/418 |
| 4,063,407 A | 12/1977 | Tansey | |
| 4,150,528 A | 4/1979 | Rendin | |
| 4,189,908 A | 2/1980 | Brock, Jr. | |
| 4,215,528 A | 8/1980 | Fodor | |
| 4,219,993 A | 9/1980 | Cosmos | |
| 4,351,145 A | 9/1982 | Farkas | |
| 4,406,113 A | 9/1983 | Mullins | |
| 4,667,458 A | 5/1987 | Barrett | |
| 4,744,208 A | 5/1988 | King | |
| 4,828,690 A | 5/1989 | Montez | |
| 4,831,815 A | 5/1989 | Bonnes | |
| 4,848,073 A | 7/1989 | Germain et al. | |
| 5,022,221 A | 6/1991 | Bonnes et al. | |
| 5,069,026 A | 12/1991 | Johnson | |
| 5,099,638 A | 3/1992 | Bass | |

(Continued)

*Primary Examiner* — Alicia Torres

(74) *Attorney, Agent, or Firm* — The Culbertson Group, P.C.; Russell D. Culbertson

(57) ABSTRACT

A lawn rake or lawn rake attachment provides a capture structure which cooperates with the tines of a lawn rake to increase the collection of small leaves and debris with each stroke of the rake. More specifically, the capture structure provides a broad surface preferably spanning the width of the rake and positioned an effective distance trailing behind the rake tine structure. In operation of the lawn rake equipped with the capture structure, during the course of a stroke of the rake the rake tines stir up the small leaves in or on the lawn grass. The stirring-up action propels the leaves a distance up above the ground before they fall back on the rake stroke trail. The trailing rake capture structure intercepts the airborne leaves and holds them at its surface while the rake is in a forward raking motion.

16 Claims, 7 Drawing Sheets

(56) References Cited

U.S. PATENT DOCUMENTS

| | | |
|---|---|---|
| 5,177,946 A | 1/1993 | Dietz, Jr. |
| 5,177,947 A | 1/1993 | Sun |
| 5,249,413 A | 10/1993 | McDonough, Jr. |
| 5,287,935 A | 2/1994 | Foeller |
| 5,357,739 A | 10/1994 | Nuss |
| 5,487,260 A | 1/1996 | Proffitt |
| 5,509,259 A | 4/1996 | Milbury |
| 5,511,370 A | 4/1996 | Patel |
| 5,522,209 A | 6/1996 | Petruzzelli |
| 5,842,336 A | 12/1998 | Chiu |
| 5,974,771 A | 11/1999 | Greenman |
| 6,032,447 A | 3/2000 | Shelton |
| 6,381,938 B1 | 5/2002 | Kelly |
| 6,526,737 B2 | 3/2003 | Martin |
| 6,640,532 B1 | 11/2003 | Bogart et al. |
| 2010/0263346 A1* | 10/2010 | Westgarde ................. 56/400.04 |

* cited by examiner

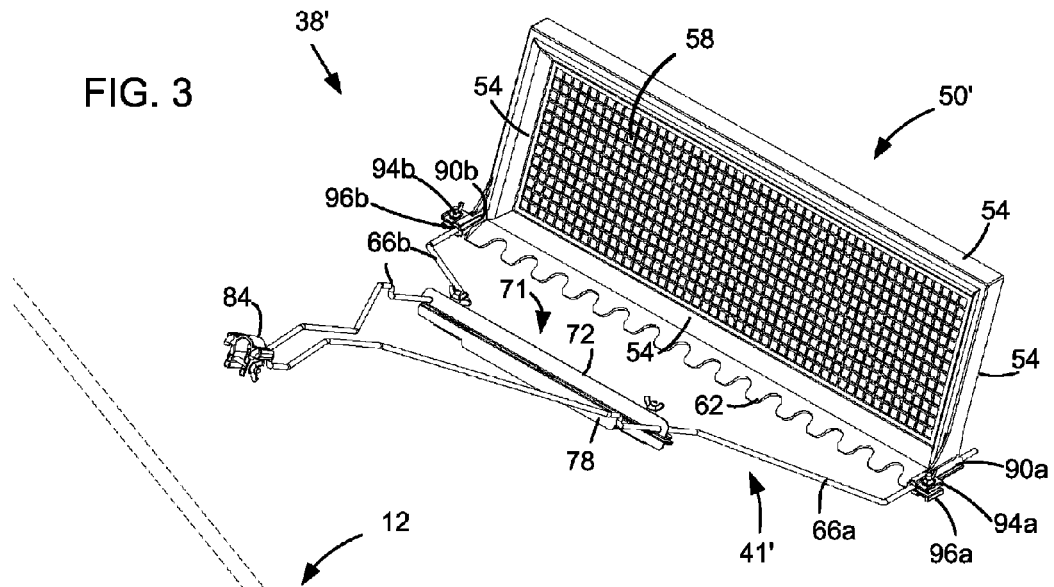
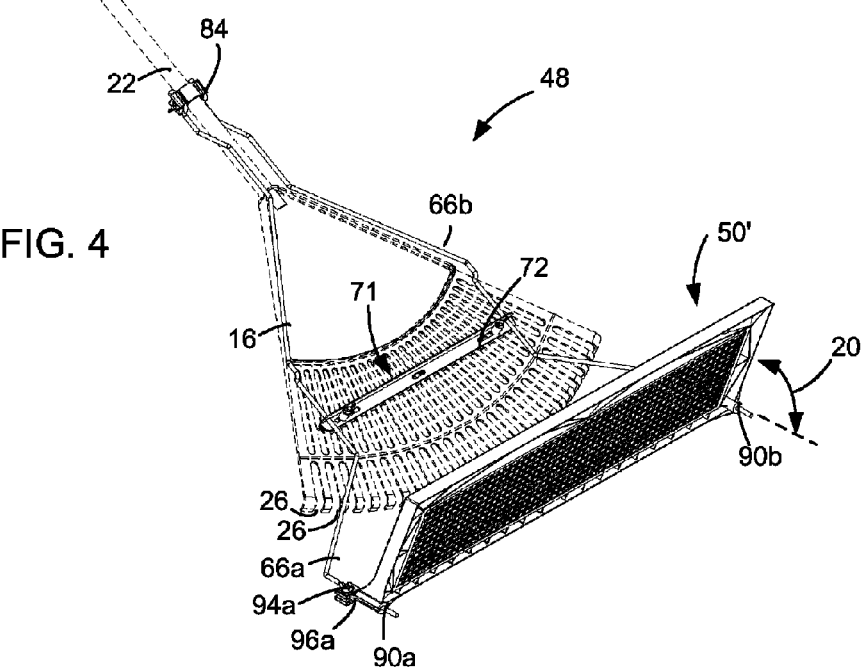

LAWN RAKE ATTACHMENT AND LAWN RAKE FOR SMALL DEBRIS

CROSS REFERENCE TO RELATED APPLICATION

The Applicant claims the benefit, under 35 U.S.C. §119(e), of U.S. Provisional Patent Application No. 61/313,550 filed Mar. 12, 2010 and entitled "LEAF RAKE ATTACHMENT FOR SMALL DEBRIS." The entire content of this provisional application is incorporated herein by this reference.

TECHNICAL FIELD OF THE INVENTION

The present invention relates to lawn and garden tools commonly used in households and commercial services. More particularly, the invention relates to a removable attachment that substantially improves the raking performance of the average lawn rake when raking small leaves and debris. The invention also encompasses a lawn rake incorporating a structure for improving the raking performance for raking small leaves and debris.

BACKGROUND OF THE INVENTION

A lawn rake is one of the most used tools for cleaning the yard from tree leaves and other debris in household and commercial lots. It has been designed and re-invented in a plethora of shapes, forms, and functionalities. Inventors throughout the past and present century have strived to come up with many improvements to its design for the purpose of increasing efficiency, lowering cost, and expanding functionality.

The most common form of the lawn rake is configured as a single row of tines as disclosed in a number of U.S. patents such as U.S. Pat. Nos. 3,724,188; 4,189,908; 4,215,528; 4,219,993; 4,831,815; 4,848,073; 5,022,221; 5,177,947; 5,487,260 and 6,032,447. Such prior art perform reasonably well for leaves and debris that are large enough to span more than one rake tine and settle at the top of the lawn surface. On the other hand, there are many types of tree leaves such as, for example, Live Oak leaves that are short and narrow enough where they do not span more than one rake tine space. Moreover, such leaves are small enough to allow them to embed within the grass blades instead of settling only at the top of the lawn. Raking such leaves using the aforementioned prior art is very cumbersome and time consuming due to the inability of the rake to prevent the leaves from passing through the tines, as well as the inability of the rake tines to effectively sweep the embedded leaves. This failure to effectively collect the leaves would necessitate multiple sweeps to clean the same area. In addition, the flexibility that is designed into the rake tines of a prior art lawn rake causes the tines to slide over the embedded small leaves and only stir the leaves up in the air to subsequently fall back on the grass behind the rake stroke as shown in FIG. 1 and explained in detail in subsequent sections.

Attempts at improving the raking efficiency are cited in U.S. patents such as U.S. Pat. Nos. 3,264,810; 4,150,528; 4,351,145; 4,744,208; 5,099,638; 5,177,946; 5,249,413; 5,511,370 and 6,381,938.

Lowell, in U.S. Pat. No. 3,264,810 (1966) shows a comb is used to sweep the debris, such as acorns, as the rake is configured in such a way that its tines slide on their back side to act as a mulch compactor. This reduces the efficiency to that of a single row rake.

Rendin, in U.S. Pat. No. 4,150,528 (1979); Farkas, in U.S. Pat. No. 4,351,145 (1982); King, in U.S. Pat. No. 4,744,208 (1988); Bass, in U.S. Pat. No. 5,099,638 (1992); Dietz, in U.S. Pat. No. 5,177,946 (1993); McDonough, in U.S. Pat. No. 5,249,413 (1993); Patel, in U.S. Pat. No. 5,511,370 (1996) and Kelly, in U.S. Pat. No. 6,381,938 (2002) all use a multiple-row configuration of tines. Although better than a single-row configuration, the multiple-row configuration has several drawbacks. The leaves that pass through the first row of tines accumulate between the first and the second row of tines which will cause the second row of tines to become ineffective in interacting with the surface being raked. Another drawback is that the increase in the number of tines, as cited in U.S. Pat. Nos. 4,744,208; 5,177,946 and 6,381,938 requires that the operator exert a higher pressure on the surface being raked in order to achieve the same tine effectiveness in interacting with the surface, and to de-embed the small leaves from the grass. Furthermore, in all of the three designs, the angle of the tine ends makes them more likely to skip over the leaves and stir them up rather than scraping them off the grass. Yet another drawback is that the operation of the rake can be cumbersome and awkward due to the extra weight and the complicated design as cited in U.S. Pat. No. 5,249,413.

The device shown in U.S. Pat. No. 4,828,690 (1989) intends to sift through debris in the soil and sand used in the garden and may not be suitable, in its form and function, for leaf raking.

In yet other attempts to improve raking efficiency, U.S. Pat. Nos. 1,509,369; 2,099,053; 6,526,737 utilize removable attachments to incorporate and co-act with existing commercial rakes.

McKesson, in U.S. Pat. No. 1,509,369 (1924) uses a corrugated sheet metal that is inserted between the rake tines for the purpose of, amongst other additional functionalities, aiding in the raking action of small debris. For this attachment to work as described, it must be used with non-flexible tine rake, which is typically not suitable for raking leaves on lawns.

Donnan, in U.S. Pat. No. 2,099,053 (1937) uses a curved attachment that is installed directly on the rigid tines of a garden rake to effectively convert the garden rake into a hoe with a toothed edge. While the attachment is positioned to catch small leaves or other debris that pass between the tines, the position of the attachment relative to the rake tines leaves little space to collect small leaves and other debris. The other feature presented is the creation of vacuum behind the attachment which is claimed to help in pulling the light debris along with the rake. Even though in theory vacuum is created, it would not be sufficient to pull the heavier lawn debris effectively and completely. In addition, this feature becomes ineffective in the presence of wind.

Martin, in U.S. Pat. No. 6,526,737 (2003) shows a rake attachment that converts a rigid-tined garden rake into a garden hoe which is not suitable for raking grass leaves.

SUMMARY OF THE INVENTION

It is a primary object of the present invention to provide lawn rake attachment that enables the rake to collect a significant amount of the small leaves and debris that are missed and pass through and around the rake tines in each stroke. Another object of the invention is to provide a lawn rake having a structure in addition to the tines which enables the rake to collect small leaves and debris that pass through and around the rake tines in the course of a raking stroke.

In the following claims and description of apparatus embodying the principles of the invention, positional terms such as, for example, "upper," "lower," "forward," "rear," etc.

will refer to the operating position of a lawn rake such as that shown in the attached FIG. 1 and FIG. 2, unless explicitly stated otherwise. Additional definitions relating to positional or directional terms may be provided for the purposes of clarity. Also, the location of various elements described in this summary section will be described below in further detail with reference to the drawings.

A lawn rake or lawn rake attachment embodying the principles of the present invention overcomes the problems associated with the prior art by providing a capture structure which cooperates with the tines of the lawn rake to increase the collection of small leaves and debris with each stroke of the rake. More specifically, the capture structure provides a broad surface preferably spanning the width of the rake and positioned an effective distance, ranging from 1 to 12 inches, trailing behind the rake tine structure. In operation of the lawn rake equipped with a capture structure according to the present invention, during the course of a stroke of the rake the rake tines stir up the small leaves in or on the grass. The stirring-up action propels the leaves a distance up above the ground before they fall back on the rake stroke trail. The trailing rake capture structure intercepts the airborne leaves and holds them at its surface while the rake is in a forward raking motion. The collection of small leaves and other debris by the capture structure in this manner significantly increases the efficiency of each raking stroke and reduces the number of strokes necessary to remove such leaves and other debris from a given area.

In one form, the invention includes an attachment for a lawn rake. The lawn rake has a tine structure with an upper end connected to a rake handle and a lower end including a number of raking tines which are spaced apart side-by-side along a raking line. A distinction should be made here between a lawn rake which has relatively flexible tines adapted to pass smoothly over lawn grass without damaging the grass, and a garden rake which has rigid tines adapted to be pulled through garden soil. The lawn rake is operable in a rake operating position in which the rake handle extends at an acute angle to a surface being raked in a raking direction and with the raking line extending generally parallel to the surface being raked.

The attachment includes a connector arrangement and the capture structure. The connector arrangement includes one or more connectors that are each operable to connect to a part of the lawn rake so as to hold the attachment in a connected position relative to the lawn rake. The capture structure defines a rear or trailing boundary of a raked debris containment volume and is connected to the connector arrangement so that the connector arrangement holds the capture structure in an operable position when the attachment is in the connected position relative to the lawn rake and the lawn rake is in the rake operating position. In particular, when the attachment is in the connected position to a lawn rake held in the operating position, the capture structure is located with a longitudinal axis thereof extending generally parallel with the raking line, with a lower edge of the capture structure located at approximately the level of lower ends of the raking tines. Also, the capture structure is separated the effective distance (between 1 to 12 inches) in a rake trailing direction from the tine structure.

A lawn rake attachment embodying the principles of the invention may also include a positioning structure interposed between the capture structure and the connector arrangement. This positioning structure may extend from a forward edge of the capture structure and cooperates with the connector arrangement to hold the capture structure in the desired position relative to the lawn rake.

The present invention also encompasses a lawn rake which includes the basic lawn rake structure and the capture structure. The lawn rake includes a rake handle, a tine structure, and the capture structure. The capture structure is positioned relative to the tine structure as described above in connection with the lawn rake attachment.

These and other advantages and features of the invention will be apparent from the following description of illustrative embodiments, considered along with the accompanying drawings.

BRIEF DESCRIPTION OF THE DRAWINGS

FIG. 3 is a perspective top back right side view of an embodiment of a rake attachment embodying principles of the present invention suitable for connection to a generic lawn rake.

FIG. 4 is a perspective top front right side view of the attachment embodiment shown in FIG. 3, as attached to a generic lawn rake.

DESCRIPTION OF ILLUSTRATIVE EMBODIMENTS

Figure 1:
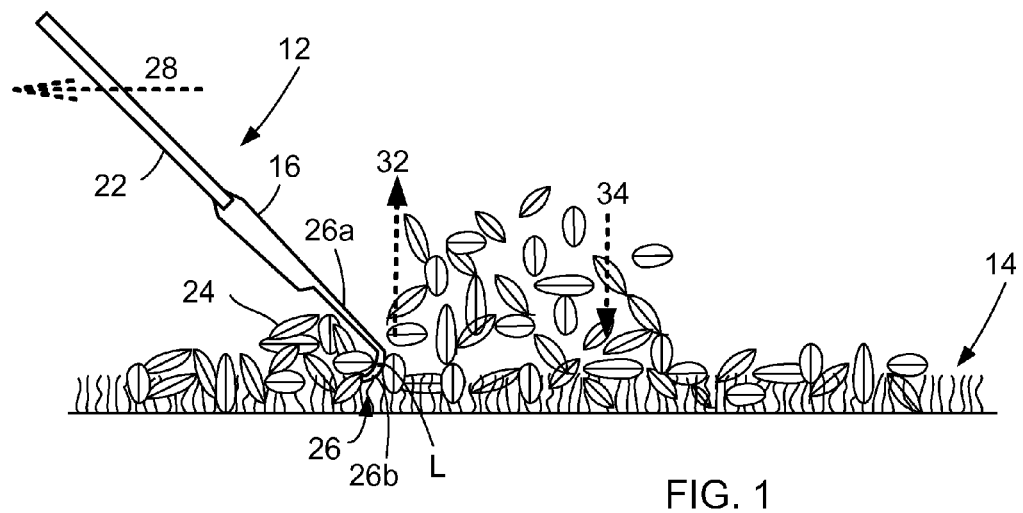
FIG. 1 is a side view illustrating the operation of the average prior art flexible lawn rake and showing how the small leaves pass through the rake tines and get stirred up above the surface before falling back on the rake stroke trail.

FIG. 1 shows a standard lawn rake 12 in normal operation to rake leaves 24 and other debris from a surface 14. Rake 12 includes a handle 22 along with a tine structure 16 (also referred to as a rake head). Tine structure 16 has an upper portion with a connection to handle 22 and a lower portion including tines 26. Tines 26 include a root portion 26a and a lower end or distal portion 26b. During normal raking, the generic lawn rake 12 is held in an operating position in which handle 22 extends at an acute angle to the surface 14 being raked and with the lower ends of the tines 26 located in contact with the surface 14. The tines 26 are arranged side-by-side and are spaced apart along a raking line extending generally parallel to the surface 14 being raked. In the side-by-side arrangement of tines 26, the root portion 26a of each tine lies in a plane extending transverse to the plane of the drawing in FIG. 1, and the distal portion 26b of each tine extends at an angle to the plane of the tine root portions and downwardly toward surface 14. The raking line is illustrated in the FIG. 1 and FIG. 2 at reference letter L, and extends perpendicular to the plane of the drawings. With rake 12 held in this rake operating position shown in FIG. 1, the rake is moved in a raking stroke in a raking direction 28 (the raking direction 28 being to the left in the orientation of the figure). As rake 12 is moved in raking direction 28, lower end of tines 26 interact with the grass and the leaves simultaneously to produce two outcomes: 1) some of the leaves 24 get caught by tines 26 and are swept along with the tines, and 2) the remaining leaves pass through and under the lower ends of tines 26. As the lower ends of tines 26 pass over the missed leaves, they press the leaves momentarily against the grass surface before tossing and propelling them upwardly in the direction indicated by arrow 32 into the air due to, amongst various factors, the snap-back action of the grass surface. The airborne leaves remain a significant distance above the ground for a short while before settling back downwardly in the direction of arrow 34 some distance trailing the lower ends of tines 26. As a result of this operation of a standard lawn rake 12 as shown in FIG. 1, the grass surface being raked remains littered with a significant amount of leaves 24 that would require numerous additional raking strokes over the same area.

Figure 2:
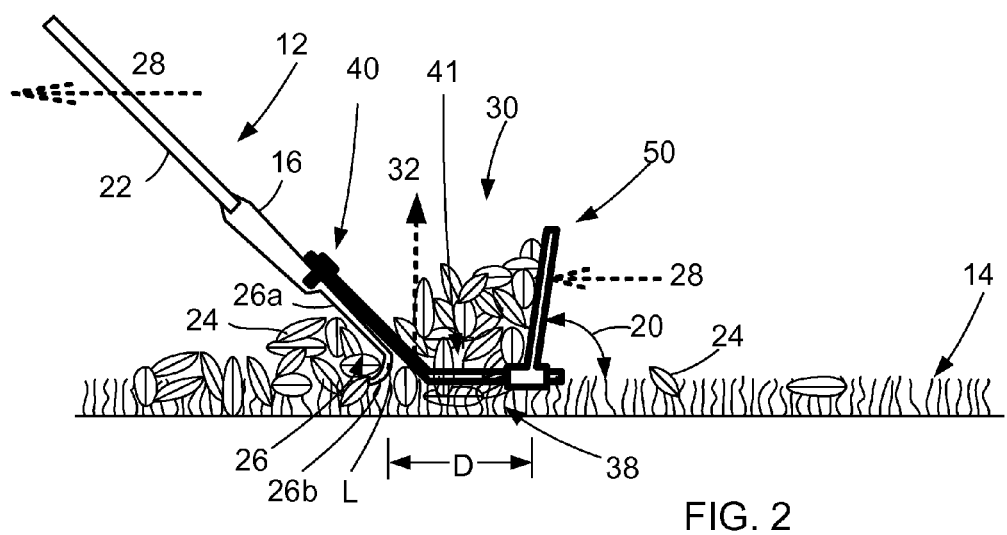
FIG. 2 is a side view that illustrates a rake attachment according to the present invention as it intercepts the stirred up airborne leaves.

A lawn rake attachment 38 embodying the principles of the present invention is shown in FIG. 2 and subsequent figures. Attachment 38 cooperates with lawn rake 12 to greatly increase the efficiency of each raking stroke with respect to the collection of debris, particularly small leaves and other debris which tends to otherwise pass under the lower ends of tines 26 as described above in connection with FIG. 1. Attachment 38 includes a connector arrangement 40 and a capture structure 50. The embodiment of attachment 38 shown in FIG. 2 also includes a positioning structure 41 connected between connector arrangement and capture structure 50. FIG. 2 shows attachment 38 in a connected position relative to lawn rake 12 with the lawn rake in the rake operating position. In this position shown in FIG. 2, capture structure 50 has a longitudinal axis extending perpendicular to the plane of the drawing page and generally parallel with the raking line L along which tines 26 are arranged. Also, a lower edge of capture structure 50 is located approximately at the level of the lower ends of tines 26, and the capture structure is separated an effective distance D from the tine structure in a rake trailing direction. As is apparent from FIG. 2, the rake trailing direction is opposite to raking direction 28.

In operation of the lawn rake 12 and attachment 38 combination shown in FIG. 2, as the rake is moved in raking direction 28 some leaves 24 are collected by tines 26 while others pass under the tines. Many of the leaves 24 which pass under tines 26 are launched upwardly in direction 32 as described above in connection with FIG. 1. However, many of the leaves 24 which are launched upwardly are collected against capture structure 50. Over the course of a raking stroke, many leaves 24 are collected in the area shown generally at 30 in FIG. 2 bounded to the rear by capture structure 50. This collection of leaves 24 in the area 30, which may be referred to as a raked debris containment volume, greatly increases the number of leaves which are collected on each stroke of the rake as compared to a stroke performed with just the basic rake 12 with no attachment according to the present invention.

It will be appreciated that there may be significant variation in the operating position of rake 12 and the connected position of attachment 38 within the scope of the invention. For example, the angle at which handle 22 extends to the surface 14 being raked may depend on the length and configuration of the handle, the configuration of tines 26 relative to the rake handle, the height of the person using the rake and attachment 38 combination, and the slope or curvature of the surface 14 and position of the rake operator relative to that slope or curvature. Generally, the acute angle formed by rake handle 22 and the surface 14 being raked will range from approximately 20 degrees to 80 degrees. Also, although the longitudinal axis of capture structure 50 may align parallel to raking line L, there may be some variation in the alignment, perhaps as much as five to ten degrees in any direction. As used in this disclosure and the accompanying claims, the reference to the lower edge of capture structure 50 being at approximately the level of the lower end of tines 26 allows a variation within the functional limitation of the capture structure in collecting leaves which pass under the rake tines. Preferably, capture structure 50 is positioned relative to the lower ends of tines 26 such that the lower edge of capture structure 50 just skims the top of the grass representing the surface 14 being raked as the rake and attachment combination is used as shown in FIG. 2. However, capture structure 50 may be positioned with its lower edge as much as an inch above the level of tines 26 in the operating position shown in FIG. 2. The "effective distance" D shown in FIG. 2 between the tine structure (the lower ends of tines 26 for this particular rake) and the capture structure 50 is also subject to significant variation within the scope of the present invention. For example, quick, powerful raking strokes tend to launch leaves further into the air and thus a longer distance D may remain effective at collecting the airborne leaves, perhaps a distance D as much as twelve inches. However, for slower, less powerful raking strokes, a shorter distance D may be more effective, perhaps as little as one inch. In any event, distance D should be long enough to allow leaves to be launched up into the air by the passing tines 26 and short enough that the capture structure is able to intercept a significant portion of the leaves while they remain airborne from the raking stroke. Also, distance D should be set so as to prevent congestion of leaves immediately after the tines and to give a good opportunity for the maximum amount of leaves to fly off the ground in order to maximize the opportunity for capture structure 50 to intercept the greatest number of leaves per stroke. A slanted angle 20 of capture structure 50 provides an upward vertical force component on the intercepted leaves for the duration of the stroke to help keep the leaves suspended on capture structure 50 and allow the leaves to fall on the ground only at the end of the stroke.

It will also be appreciated that there may be some variation of the orientation of raking line L and the longitudinal axis of capture structure 50. For example, it is possible for one to rotate rake handle 22 about its longitudinal axis. This rotation would place the raking line L at an angle to surface 14 rather than being parallel to the surface. It is also possible that the longitudinal axis of capture structure 50 could be modified so as to provide a varying distance D along the length of the capture structure. While these variations tend to diminish the effectiveness of the raking stroke, it is intended that the positional definitions set out in the accompanying claims encompass these variations within the functional limitations of the arrangement of rake and attachment combination.

It will be noted that in the operating position for lawn rake 12 and attachment 38 shown in FIG. 2, capture structure 50 is located above the plane defined by the root portions 26a of tines 26, and is also located above the longitudinal axis of lawn rake handle 22. Also, with rake handle 22 at about 45 degrees to surface 14, both the upper edge and lower edge of capture structure 50 are separated a respective effective distance from the rearmost part of tine structure 16. In this illustrated embodiment with capture structure 50 at angle 20, the upper edge of the capture structure trails tine structure 16 slightly more that the lower edge of the capture structure.

One embodiment of the present invention is illustrated in detail in FIG. 3-FIG. 12. Due to the symmetry of the attachment and the attaching components, only the right side will be illustrated in FIG. 5-FIG. 10 and described hereafter. All of the ensuing detailed description of the right side will be equally applicable to the mirrored structure on the left side. FIG. 3 illustrates a rake attachment 38', comprising a capture structure 50', a positioning structure generally shown at 41', and a connector arrangement made up of first connector 84 and second connector 71. Positioning structure 41' includes a right connecting rod 66a a left connecting rod 66b. Second connector 71 includes a top attaching bracket 72 and a bottom attaching bracket 78, while first connector 84 comprises a rake handle attaching clamp. Capture structure 50' is the primary leaf receiving component and is attached to rods 66a and 66b at a right and left interface cylinders 90a and 90b, respectively, located at the right and left bottom corners of capture structure 50. The interface of rods 66a and 66b to cylinders 90a and 90b, respectively, allow the user to adjust the horizontal distance, that is, the effective distance D indicated in FIG. 2, between capture structure 50 and the ends of tines 26. Brackets 72 and 78 and clamp 84 secure rods 66a and 66b to rake 12 in the connected position in which attachment 38' is operable with the rake, and allow the user to adjust the height of capture structure 50' relative to the lower ends of tines 26. Capture structure 50' includes a frame 54 with a rear boundary panel 58 surrounded by the frame. The capture structure frame 54 and clamp 84 are preferably made out of injection molded plastic for low cost and weight advantages. The rods 66a and 66b and brackets 72 and 78 are preferably made out of aluminum for strength, flexibility, low weight, and cost advantages.

FIG. 4 illustrates a typical configuration 48 of the rake attachment 38' as it is attached to the generic rake 12.

Capture structure 50', with its frame 54 and rear boundary panel or leaf intercept surface 58 provides a broad surface that preferably spans the width of collection of side-by-side tines 26 of rake 12. As shown particularly in FIG. 3, the rear boundary panel 58 is recessed toward the rear of frame 54, and the capture structure 50' further includes a teethed bottom edge 62. Right connecting cylinder 90a is associated with top and bottom cylinder tabs 94a and 96a, respectively. Left connecting cylinder 90b is associated with top and bottom cylinder tabs 94b and 96b, respectively. Rear boundary panel 58 is comprised of vertical and horizontal elements to form an open mesh structure which allows air to readily pass there through. The vertical and horizontal mesh elements are kept to a minimum thickness dimension that can be reliably manufactured and that keeps the weight to a minimum. The vertical and horizontal (or otherwise oriented) elements making up rear boundary panel 58 are separated by a distance that is smaller than the smallest dimension of the leaves and debris. The lower edge teeth 62 are slanted at a small angle with respect to the surface to be raked when the rake and attachment are in the operating position to aid in raking off the leaves that passed through but never flew off the ground.

Figure 5:
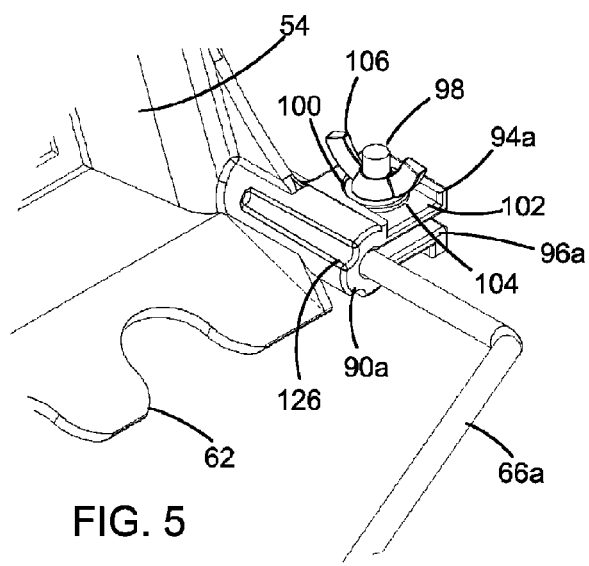
FIG. 5 is a perspective top back left side view of a portion of the right side of the attachment shown in FIG. 3.
Figure 6:
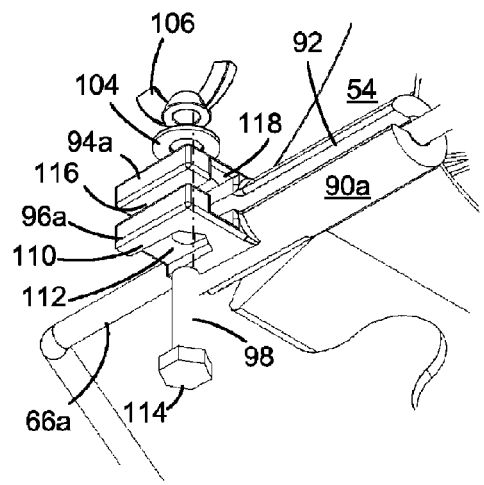
FIG. 6 is a perspective bottom front right side partially exploded view of the portion of the attachment shown in FIG. 5.
Figure 7:
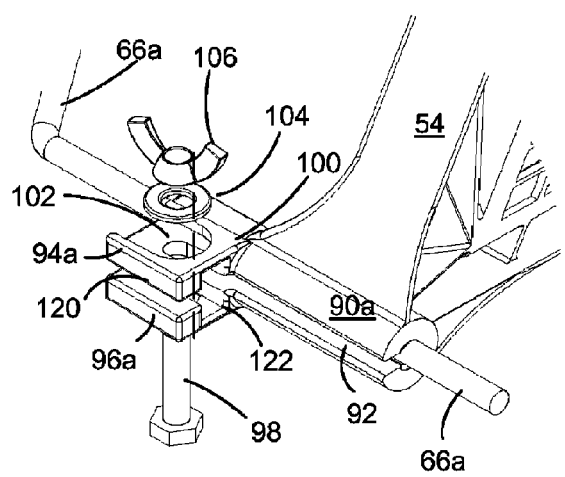
FIG. 7 is a perspective top back right side partially exploded view of the portion of the attachment shown in FIG. 5.

FIG. 5-FIG. 7 illustrate the details of the ensuing description of the right side of capture structure 50' to rod 66a interface. Capture structure 50' connects to rod 66a through the connecting cylinder 90a. Cylinder 90a is cut out on its right side from front to back with a slit 92 to provide flexibility for inserting and clamping onto rod 66a. The top and bottom tabs 94a and 96a, respectively, extend over part of slit 92 to provide a way for clamping cylinder 90a onto rod 66a. Tabs 94a and 96a have a hole at the center of their top and bottom faces that accommodate a bolt shaft 98. The top face 100 of the top tab 94a has a recess 102 to accommodate a washer 104 and a wing nut 106 that is coupled to the bolt shaft 98. The bottom face 110 of the bottom tab 96a has a recess 112 to accommodate a polygonal shaped bolt head 114. The side walls of recess 112 assume a significant portion of the polygonal shape of the bolt head perimeter to help in preventing the bolt from turning while wing nut 106 is being turned. The combination of the bolt 98 washer 104 wing nut 106 and tabs 94a and 96a work simultaneously to secure capture structure 50' to rod 66a by clamping on rod segment 66a when the wing nut 106 is tightened. Additionally, cylinder 90a has a notch 126 at two locations at the opposite side of tabs 94a and 96a to increase the flexibility of the clamp. Moreover, the length of rod segment 66a that is inserted into cylinder 90 provides a way for selecting a suitable distance between capture structure 50' and the ends of rake tines 26 in order to optimize the distance D (shown in FIG. 2) to the user's physical attributes and/or the operating conditions to optimize performance of attachment 38'. The bottom face 116 of top tab 94a has a recess 118 and the top face 120 of bottom tab 96a has a recess 122 to reduce the cost of manufacturing when plastic injection mold techniques are use to make frame 54 of capture structure 50'. It will be appreciated that any description of the details of FIG. 5-FIG. 7 in the present paragraph shall hold true for the corresponding details mirrored on the left side of attachment 38' where capture structure 50' connects to rod 66b.

Figure 8:
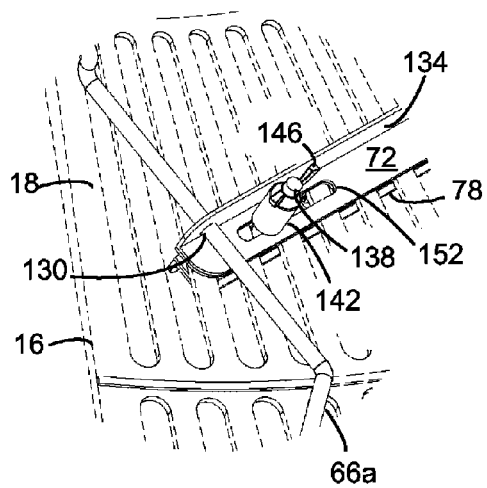
FIG. 8 is a perspective top front right side view of another portion of the attachment shown in FIG. 3.
Figure 9:
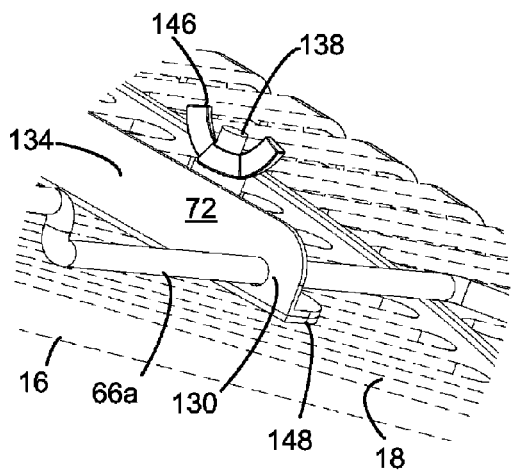
FIG. 9 is a perspective top back right side view of the portion of the attachment shown in FIG. 8.
Figure 10:
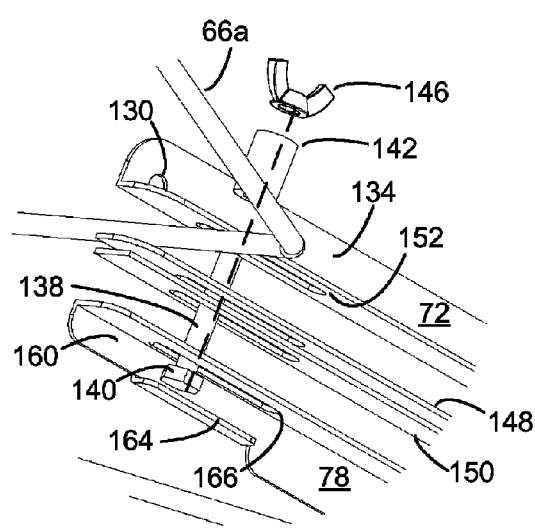
FIG. 10 is a perspective bottom front right side exploded view of a portion of a connector shown in FIG. 8.

FIG. 8-FIG. 10 illustrate details of the cooperation between connectors 84 and 71 in connecting rod 66a to rake 12. Connecting rod 66a is secured laterally by the top attaching bracket 72 through a hole 130 located on an upright side 134 of the bracket. The diameter of hole 130 is slightly larger than the diameter of rod 66a to allow freedom of axial movement of the rod over the length of adjacent straight portion of rod 66a. Bracket 72 is affixed to a top side 18 of tine structure 16 using a bolt 138, a spacer 142, a wing nut 146, a top bracket liner 148, bracket 78, and a bottom bracket liner 150. Furthermore, a bolt head 140 affixes the bottom bracket 78 to the bottom side of tine structure 16 opposite to top side 18. An upright side 160 of the bottom bracket 78 has a bent section 164 that keeps bolt 138 from falling during the installation of the attachment assembly 38' (FIG. 3) to rake 12. The top and bottom bracket liners 148 and 150, respectively, are made out of a soft material such as rubber with an adhesive on one side to affix them to their respective brackets. The liners help in reducing slipping of brackets over the rake tines, especially if the brackets and the tines are made out of metal. Moreover, the lining helps ease the tightening of wing nut 146 by introducing a gradual increase in resistance against it during the tightening action. A bottom bracket bolt slot 166 accommodates bolt 138 and is close enough to face 160 to cause one side of the polygon shaped bolt head 140 to mate to side 160 to prevent it from turning during tightening of wing nut 146. Spacer 142 is long enough to allow wing nut 146 to turn freely. Slots 152 and 166 are long enough to span more than one rake tine pitch to allow freedom of bolt positioning. Such freedom is needed to accommodate various rake tine configurations and shapes. It will be appreciated that any description of the details of FIG. 8-FIG. 10 in the present paragraph shall hold true for the corresponding details mirrored on the left side of tine structure 16.

Figure 11:
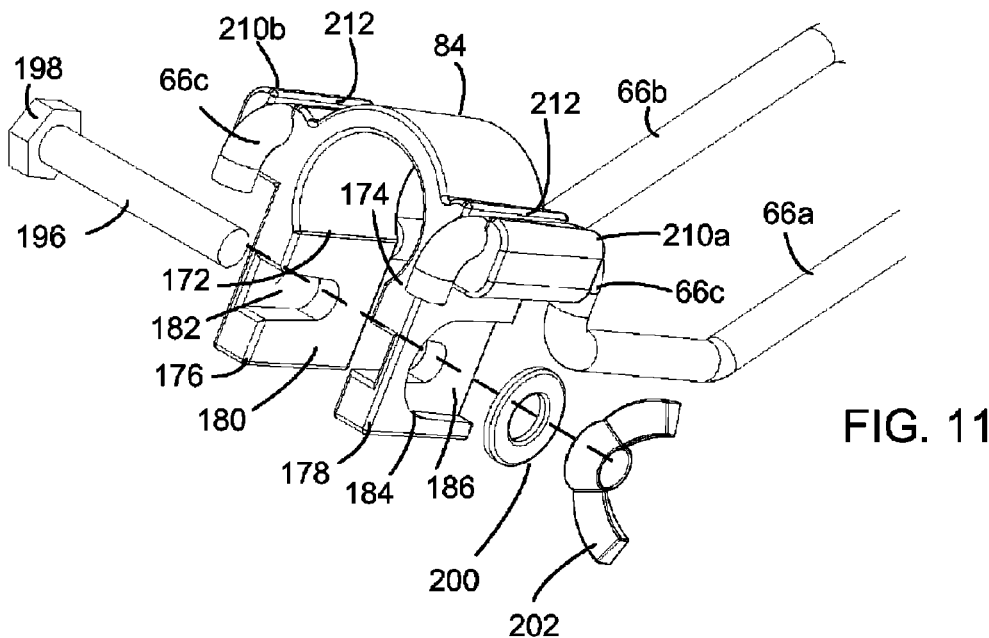
FIG. 11 is a perspective top back right side partially exploded view of another connector of the attachment shown in FIG. 3.
Figure 12:
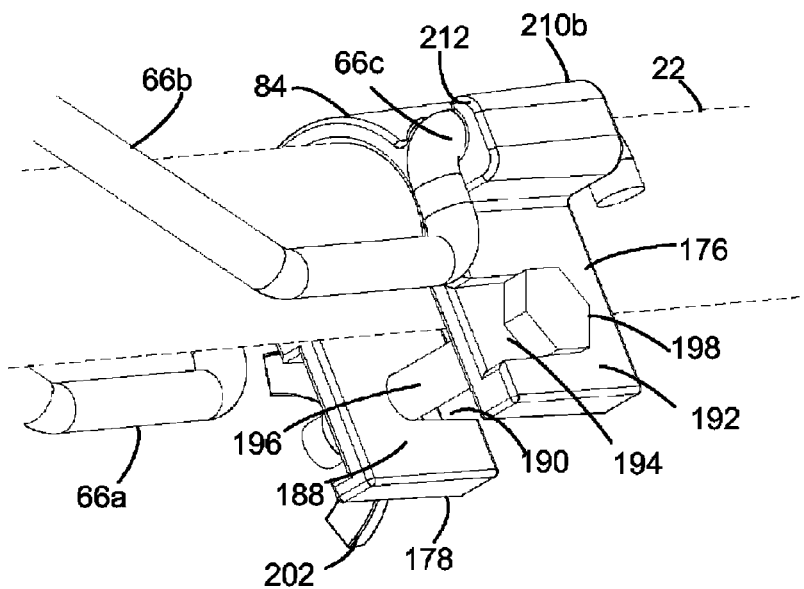
FIG. 12 is a perspective bottom front left side view of the connector shown in FIG. 11 as connected to a rake handle.

FIG. 11-FIG. 12 illustrate details of clamp 84 and its interface with rods 66a and 66b and rake handle 22. Clamp 84 is shaped like a cylinder having a diameter that is closely similar to that of handle 22. It has a significant opening at left and right edges 172 and 174. A left tab 176 and a right tab 178 extend from the cylinder opening edges 172 and 174. An outer surface 184 of tab 178 has a recess 186 to accommodate a washer 200. An inner surface 188 of tab 178 has a recess 190 to lower the cost of manufacturing when plastic injection molding technique is used and, in conjunction with recess 186, to produce a hole to accommodate a bolt shaft 196. An outer surface 192 of tab 176 has a recess 194 to accommodate a polygonal shaped bolt head 198. An inner surface 180 of tab 176 has a recess 182 to lower the cost of manufacturing and, in conjunction with recess 190, to produce a hole to accommodate bolt shaft 196. The side walls of recess 194 assume a significant portion of the polygonal shape of a bolt head 198 perimeter to help in preventing bolt 196 from turning while turning a wing nut 202. The combination of the bolt 196 washer 200 wing nut 202 and tabs 176 and 178 work simultaneously to secure clamp 84 to rake 16 by clamping on handle 22 when wing nut 202 is tightened. Right and left rods 66a and 66b are affixed to clamp 84 through a right and left snap-on tabs 210a and 210b respectively. Clamp 84 is made out of flexible material such as plastic to permit it to be installed on rake handle 22 by expanding the distance between tabs 176 and 178 and sliding the clamp laterally onto rake handle 22. Moreover, the flexibility permits rods 66a and 66b to be pressed between the lips 212 of tabs 210a and 210b in order to snap-fit them inside. Furthermore, rods 66a and 66b are each bent in multiple locations in a respective end section 66c in order to affix the rods in the axial direction.

Clamp 84 provides a way for the adjustment of the height of capture structure 50' with respect to the ends of rake tines 26 (FIG. 3). This height adjustment is achieved by moving clamp 84 axially along the rake handle 22 which results in moving rods 66a and 66b axially through holes represented by 130 of bracket 72 for the length of the straight portion of the respective rod which passes through the respective hole 130 (FIG. 8 and FIG. 9) which, in turn, causes a vertical movement of capture structure 50' with respect to the ends of tines 26. Vertical movement in this context occurs when the rake 12 is in operating position (including 30 degrees with respect to the surface to be raked for example) where the rake tines 26 are on the surface to be raked. Moreover, the freedom of the axial movement through hole 130 allows bracket 72 the freedom to be affixed to the rake over a range of locations along the rake tines 26. Such provision serves the following purposes: 1) to allow the attachment of bracket 72 to a wide range of rake designs and 2) to allow the adjustment of the pressure that capture structure 50' exerts on the surface to be raked during the raking stroke. Such pressure results from the tension due to the flexibility of rods 66a and 66b. By changing the location of bracket 72, the pivoting point at representative hole 130 is changed along the respective rod 60a and 60b effectively changing the free hanging length of rods 66a and 66b. The longer the free hanging segment of rods 66a and 66b the more flexible it would be and the less tension it would exert on capture structure 50' and vise versa. Such tension and flexibility are needed to keep both the ends of tines 26 and the capture structure 50' firmly and simultaneously placed on the grass surface as the rake angle changes from a shallow to a steep angle as the stroke progresses towards the operator.

Operation

The manner of using a rake equipped with attachment 38' according to the present invention is identical to that of using the regular generic lawn rake. The operator initially installs the attachment 38'. The operator mates brackets 72 to top side 18 of tine structure 16 after choosing a suitable middle spot in a horizontal orientation, or, perpendicular to the rake handle then mates bracket 78 to the opposite side of side 18 while aligning the pre-installed bolts 138 of bracket 78 through tine spaces and with slots 152 of bracket 72. The operator installs the spacer 142 and wing nut 146 then tightens them on the left and right sides of bracket 72. The operator installs clamp 84 along with bolt 196 washer 200 and wing nut 202. Next, the operator installs rods 66a and 66b by inserting the lower ends of rods 66a and 66b through holes represented by 130 on the right and left sides of bracket 72 entering from the rake handle side until the intermediate straight segment of the respective rod 66a and 66b is in the hole. Next, the operator places bends 66c around the snap-on tabs 210 and 210' and presses rods 66a and 66b firmly to insert them into the tabs. Finally, the operator inserts the lower end segment of rods 66a and 66b into cylinders 90a and 90b, respectively, and tightens the combination of bolt 98 washer 104 and wing nut 106 so that tabs 94a, 96a, 94b and 96b clamp onto and secure rods 66a and 66b respectively.

Before the raking resumes after thusly connecting attachment 38', the operator may need to make adjustments to the height of capture structure 50' relative to the lower ends of tines 26 and trailing distance D (FIG. 2) of capture structure 50'. To adjust the height, the operator positions the rake at a shallow angle (30 degrees for example) by placing handle 22 at an edge of a table, for example, to configure the rake in the extended position that it would be in at the starting point of the raking stroke. The operator loosens clamp 84 and slides it axially on rake handle 22 as necessary to cause capture structure 50' to touch the ground simultaneously with tine ends 26, then tightens the clamp. To adjust the trailing distance D (FIG. 2) between capture structure 50' and the ends of tines 26, the operator loosens wing nuts represented by 106 on the right and left sides of capture structure 50', and slides cylinders 90a and 90b over the end segments of rods 66a and 66b, respectively, then re-tightens the wing nuts. This adjustment may be needed to optimize the rake and attachment performance to the stroking speed. In a fast stroke, the stirred up leaves remain airborne over a longer distance and at higher elevation trailing the rake. Increasing the trailing distance D between capture structure 50' and the ends of tines 26 to more than 4 inches gives more space to the leaves to fly higher and be less congested as they are intercepted by the rear boundary panel or intercepting structure 58 (FIGS. 3 and 4). On the other hand, a slow stroke stirs up the leaves only to a small height where they drop back to the surface fairly quickly and in a short distance trailing the rake tines. By decreasing the distance between capture structure 50' and the ends of tines 26 to less than 4 inches, it gives the capture structure more opportunity to intercept the low flying leaves before the leaves drop back to the ground, thus, operating optimally.

In operating the rake and attachment combination, the operator assumes a posture and moves the rake and attachment in a normal way that a regular rake is used. The connection between the attachment and the rake is preferred to be flexible in the upward bending direction. Depending on the physical attributes of the operator and the rake, the rake's angle with the ground can be as low as 30 degrees at the start of the stroke when it is farthest from the operator and near 90 degrees towards the end of the stroke when it is nearest to the operator. The aforementioned flexibility of the connecting hardware permits the capture structure and the rake tines to remain in contact with the surface to be raked simultaneously over a wide range of angles during each stroke, permitting an optimal functionality.

Alternative Embodiments

Figure 13A:
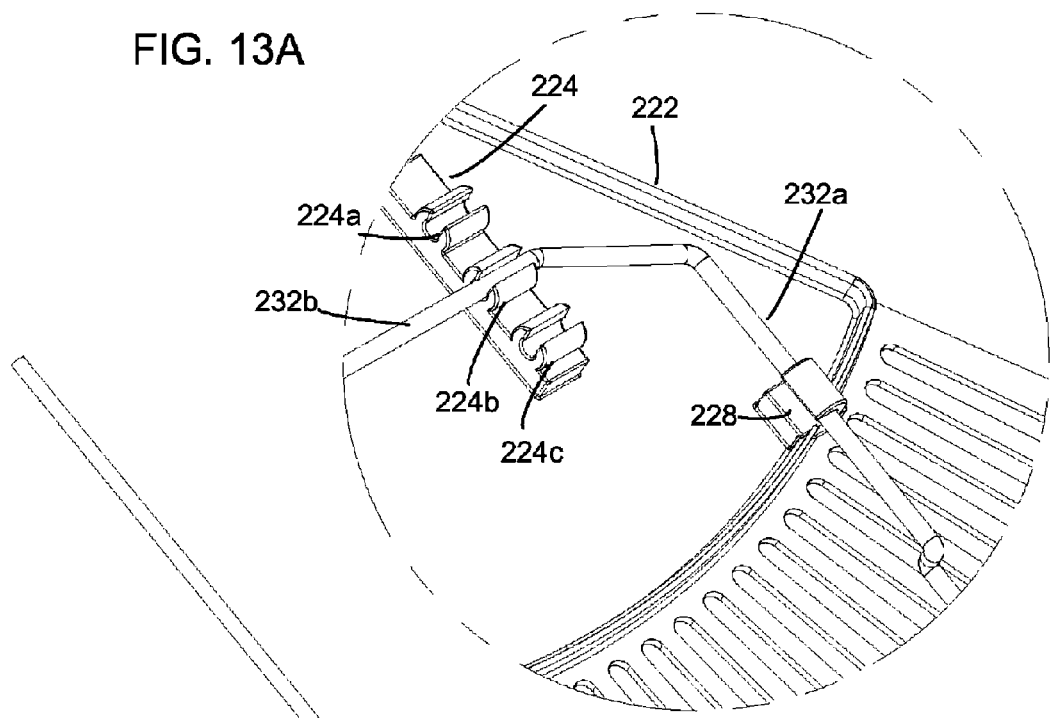
FIG. 13A is an enlarged partial view of the integrated clip arrangement shown in FIG. 13.
Figure 13:
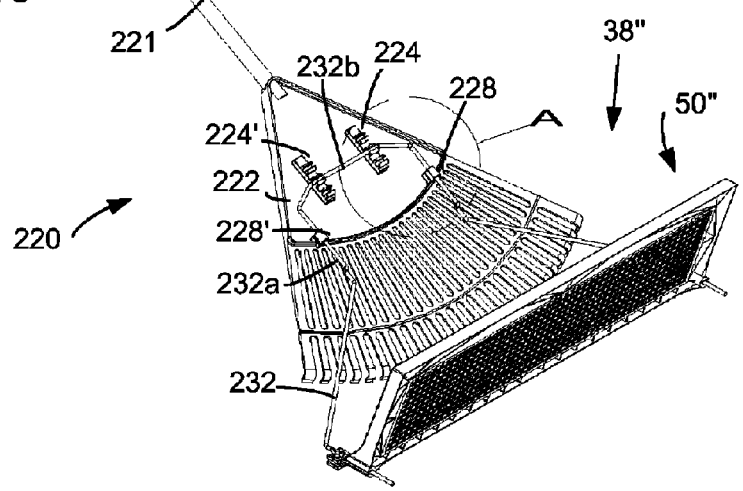
FIG. 13 is a perspective top front right side view of an alternative embodiment showing a tine structure with an integrated clip arrangement for connection a rake attachment according to one form of the present invention.
Figure 14:
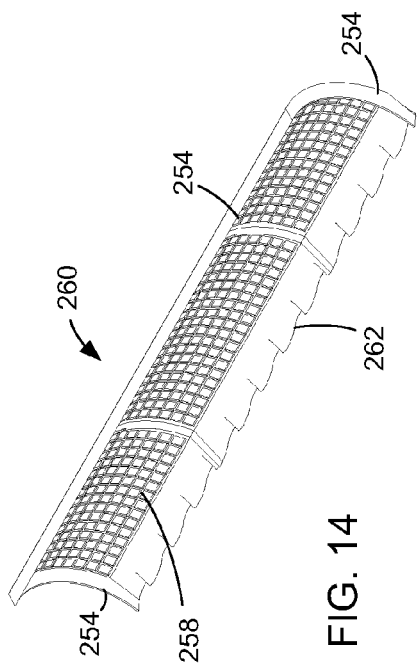
FIG. 14 is a top right view in perspective of an alternative embodiment of a capture structure which may be employed in a rake or rake attachment embodying the principles of the invention.
Figure 18:
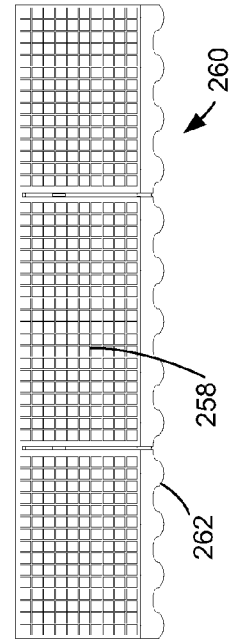
FIG. 18 is a back view of the capture structure shown in FIG. 14.
Figure 19:
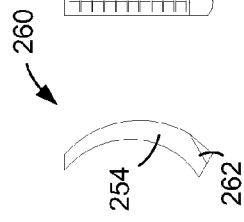
FIG. 19 is a right side view of the capture structure shown in FIG. 14.
Figure 15:
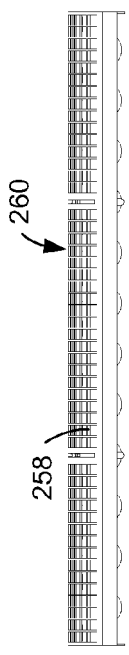
FIG. 15 is top view of the capture structure shown in FIG. 14.
Figure 17:
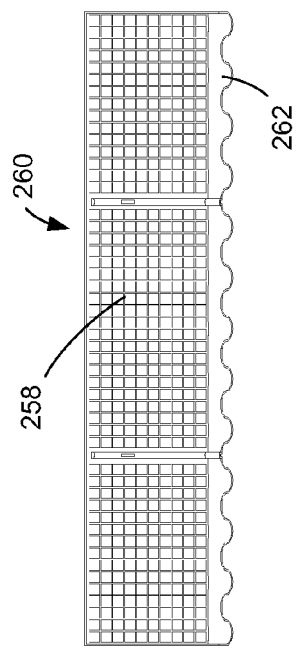
FIG. 17 is a front view of the capture structure shown in FIG. 14.
Figure 16:
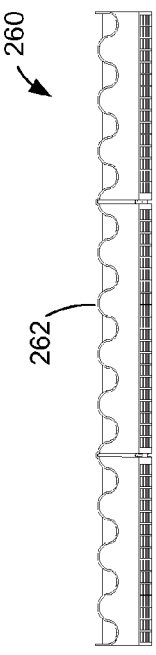
FIG. 16 is a bottom view of the capture structure shown in FIG. 14.

There are various possibilities with regard to the shape, angle, orientation, form, material, connection and attachment methods, and various combinations of components and their material from which a lawn rake attachment can be made and configured within the scope of the present invention. The embodiment described in connection with FIGS. 3-12 shows one way to make and configure the rake attachment such that it can be installed on many different rake models and makes, which the users may have in their possession, in order to provide an added value for the rake's use in certain environments and augment its utility. FIG. 13 and FIG. 13A illustrate an example of an alternative embodiment of the rake attachment, whereby parts of the attaching apparatus may be made an integral part of the tine structure or rake head 222 design, or may be readily connected to the tine structure. In this example, a rake 220 includes a handle 221 connected to a plastic injection molded tine structure 222 which is adapted to receive an attachment 38". Tine structure 222 has snap-on clip sets 224, 224' and single clips 228 and 228' that are located on the top surface thereof to facilitate attaching connecting rod 232 to the rake head. Moreover, clips 228 and 228' allow rod 232 to be moved axially throughout the length of rod segment 232a in order to facilitate height adjustment of the capture structure 50" associated with attachment 38". Furthermore, rod segment 232b clips on multiple locations 224a, 224b or 224c in order to select several height adjustments of capture structure 50". Furthermore, clips 228 and 228' permit attaching rod 232 from the side so that the forces exerted on the rod during normal raking do not un-attach the rod from the clips. This example illustrates how a rake manufacturer may include such attaching feature as an added value to accommodate the attachment and expanding the utility of the rake. The presented positions, shapes, or rod bend angles are meant for illustration purpose and not meant to be limiting. In yet another example, the aforementioned feature may also be implemented on an all metal design rake heads where the clips may be made out of metal. In a further example of the present invention, a rake manufacturer may produce the rake head/tine structure along with the capture structure along the lines of capture structure 50' as one structure where the capture structure is a permanent feature of the rake head/tine structure.

FIGS. 14-19 illustrate another form of the capture structure/intercepting surface which may be used in forms of the present invention. In this form, capture structure 260 has a curved, "C" shaped profile and is adapted to be used with the opening of the "C" shape facing in the raking direction (28 in FIG. 2). Alternative capture structure 260 also includes a lower edge 262 formed in a wavy, sinusoidal shape with its bottom rim's profile forming an acute angle with the surface to be raked such as 30 degrees as illustrated in the right side view of FIG. 19. The "C" shaped profile provides two simultaneous benefits: 1) the bottom half of the attachment is slanted away from the rake at an angle that provides an upward vertical force component on the intercepted leaves for the duration of the stroke to help keep the leaves suspended on the capture structure 260, and 2) the top half of the capture structure 260 is slanted towards the rake in order to intercept the high energy flying debris without the need to have a very high upper edge of the intercepting surface. This helps in reducing the weight and the center of mass of the attachment to improve its handling. The lower edge 262 of this embodiment provides a yet alternate way to aid in raking off the leaves that passed through but never flew off the ground. In this shape, the waviness of the lower edge 262 combs through the grass blades to help in scooping off the leaves remaining on the surface. The acute angle of its lower rim helps prevent the lower edge 262 from getting caught in a grass root runner or any other object that may cause a teeth shaped edge to get stuck while raking.

Capture structure 260 shown in FIGS. 14-19 includes a frame 254 similar to the frame 54 described above, but providing the "C" shape described above. Capture structure 260 also includes a rear boundary panel/intercepting panel 258 serving to intercept and collect leaves that become airborne as the rake tines pass over the surface being raked. Rear boundary panel 258 comprises an open mesh or net material. As with the open mesh material 58 described above, the open mesh material allows air to flow there through during the raking stroke and this flow through action helps trap leaves against the panel. It will be apparent from FIGS. 14-19 that rear boundary/intercepting panel 258 forms a "C" shape facing toward the rake to which it is attached so as to have a concave curvature about an axis extending parallel to the longitudinal axis of the capture structure and facing in the raking direction.

Although the description above contains several examples of rake-attachment configurations and their specificities, these should not be construed as limiting the scope of the invention but as merely providing illustrations of some of the presently preferred and possible embodiments of this invention. Many other variations are possible. For example, the attachment may have shapes other than a rectangle such as trapezoid, triangle oval or otherwise. The open mesh or net rear boundary panel may not be implemented and a plane surface would be used. Where an open mesh or net structure is used, the net structure may assume other shapes such as, but not limited to, circles, triangles or many other ornamental shapes and designs. The connecting method can assume a large space of possibilities for attaching the rake attachment to the rake or rake head/tine structure. Moreover the material may be other than plastic or aluminum in any possible combination.

From the above, the reader will see that the rake attachment of the invention provides a highly augmented rake performance and efficiency for small leaves and debris. Moreover, the reader will see that a minimally intrusive light weight and multi-dimensionally optimizable solution is introduced to solve a historically persistent raking problem.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. An attachment for a lawn rake, the lawn rake (i) having a tine structure with an upper end connected to a rake handle and a lower end including a number of raking tines which are spaced apart side-by-side along a raking line, the raking tines each including a root portion and a distal portion, each root portion lying in a first plane and each distal portion extending at an angle to the first plane, and (ii) being operable in a rake operating position in which the rake handle extends at an acute angle to a surface being raked in a raking direction and in which the distal portion of each raking tine extends downwardly toward the surface being raked and terminates at a position below the first plane, the attachment including:
   (a) a connector arrangement operable to provide a connection between the attachment and the lawn rake to hold the attachment in a connected position relative to the lawn rake; and
   (b) a capture structure defining a rear boundary of a raked debris containment volume, the capture structure being connected to the connector arrangement such that when the attachment is in the connected position relative to the lawn rake and the lawn rake is in the rake operating position with the rake handle at 45 degrees to the surface being raked, (i) the capture structure is located entirely above the first plane with a lower edge of the capture structure closest to the raking tines located at approximately the level of the distal ends of the raking tines, and (ii) both an upper edge of the capture structure and the lower edge of the capture structure closest to the raking tines are separated a respective effective distance in a rake trailing direction from a rearmost part of the tine structure, the rake trailing direction being opposite to the raking direction and the rearmost part of the tine structure being that part of the tine structure that extends furthest from the rake handle in the rake trailing direction.

2. The attachment of claim 1 wherein the capture structure includes an air-permeable rear boundary panel which defines at least a portion of the rear boundary of the raked debris containment volume, the air-permeable rear boundary panel being connected along a first lateral edge to a first frame member and along a second lateral edge to a second frame member with an air-permeable portion of the air-permeable rear boundary panel located between the first frame member and second frame member.

3. The attachment of claim 1 wherein the capture structure includes an air-permeable rear boundary panel which defines at least a portion of the rear boundary of the raked debris containment volume, and wherein the rear boundary panel includes an open mesh structure made up of a number of first mesh elements and a number of second mesh elements, the first mesh elements extending transverse to the second mesh elements to define mesh openings there between.

4. The attachment of claim 2 wherein the rear boundary panel includes a concave curvature about an axis extending substantially parallel to the longitudinal axis of the capture structure and facing in the raking direction when the attachment is in the connected position relative to the lawn rake and the lawn rake is in the rake operating position.

5. The attachment of claim 1:
   (a) wherein the connector arrangement includes (i) a first connector connected to the rake handle when the attachment is in the connected position relative to the lawn rake, and (ii) a second connector connected to the tine structure when the attachment is in the connected position relative to the lawn rake; and
   (b) further including a positioning structure connected between the second connector and the capture structure.

6. The attachment of claim 5 further including an adjustable connector connecting the capture structure and the positioning structure, the adjustable connector facilitating adjustment of the distance between the capture structure and the lower ends of the raking tines.

7. The attachment of claim 1:
   (a) wherein the connector arrangement includes (i) a first connector connected to an upper portion of the tine structure when the attachment is in the connected position relative to the lawn rake, and (ii) a second connector connected to a lower portion of the tine structure when the attachment is in the connected position relative to the lawn rake; and
   (b) further including a positioning structure connected between the second connector and the capture structure.

8. The attachment of claim 7 further including an adjustable connector connecting the capture structure and the positioning structure, the adjustable connector facilitating adjustment of the distance between the capture structure and the lower ends of the raking tines.

9. An attachment for a lawn rake, the attachment including:
   (a) a capture structure defining a boundary for a raked debris containment volume, the capture structure including a rear boundary panel connected between at least two opposing frame members of the capture structure, the rear boundary panel including an open mesh structure made up of a number of first mesh elements and a number of second mesh elements with the first mesh elements extending transverse to the second mesh elements to define mesh openings there between;
   (b) a positioning structure adapted to be connected to the capture structure in a forward position to extend from a forward edge of the capture structure so as to provide a distal end of the positioning structure spaced apart from the forward edge of the capture structure;
   (c) a connector arrangement connected to the positioning structure at the distal end of the positioning structure such that the positioning structure maintains a separation between the connector arrangement and the forward edge of the capture structure, the connector arrangement being operable to provide a connection between the attachment and a lawn rake; and
   (d) an adjustable connector connecting the capture structure and the positioning structure, the adjustable connector facilitating adjustment of the distance between the connector arrangement and the capture structure.

10. The attachment of claim 9 wherein the rear boundary panel includes a concave curvature about a longitudinal axis of the capture structure, the concave curvature facing in the direction the positioning structure extends from the forward edge of the capture structure when the positioning structure is connected to the capture structure in the forward position.

11. The attachment of claim 9:
(a) wherein the connector arrangement includes (i) a first connector operable to connect to a rake handle of a lawn rake, and (ii) a second connector operable to connect to a tine structure of the lawn rake; and
(b) wherein the positioning structure is connected between the second connector and the capture structure.

12. The attachment of claim 9:
(a) wherein the connector arrangement includes (i) a first connector operable to connect to an upper portion of a tine structure of a lawn rake, and (ii) a second connector operable to connect to a lower portion of the tine structure; and
(b) wherein the positioning structure is connected between the second connector and the capture structure.

13. A lawn rake including:
(a) an elongated rake handle;
(b) a tine structure with an upper end connected to the rake handle and a lower end including a number of raking tines which are spaced apart side-by-side along a raking line, the lawn rake being operable in a rake operating position in which (i) the longitudinal axis of the rake handle extends at an acute angle to a surface being raked in a raking direction and with the raking line extending generally parallel to the surface being raked, and (ii) the lower ends of the raking tines are positioned below the longitudinal axis of the rake handle; and
(c) a capture structure defining a rear boundary of a raked debris containment volume, the capture structure being connected to the remainder of the lawn rake such that when the lawn rake is in the rake operating position at 45 degrees to the surface being raked, (i) the capture structure is located above the longitudinal axis of the rake handle, and with a lower edge of the capture structure closest to the raking tines located at approximately the level of lower ends of the raking tines, and (ii) both an upper edge of the capture structure and the lower edge of the capture structure closest to the raking tines is separated a respective effective distance in a rake trailing direction from a rearmost part of the tine structure, the rake trailing direction being opposite to the raking direction and the rearmost part of the tine structure being that part of the tine structure that extends furthest from the rake handle in the rake trailing direction.

14. The lawn rake of claim 13 wherein the capture structure includes an air-permeable rear boundary panel which defines at least a portion of the rear boundary of the raked debris containment volume, the air-permeable rear boundary panel being connected along a first lateral edge to a first frame member and along a second lateral edge to a second frame member with an air-permeable portion of the air-permeable rear boundary panel located between the first frame member and second frame member.

15. The lawn rake of claim 13 wherein the capture structure includes an air-permeable rear boundary panel which defines at least a portion of the rear boundary of the raked debris containment volume, and wherein the rear boundary panel includes an open mesh structure made up of a number of first mesh elements and a number of second mesh elements, the first mesh elements extending transverse to the second mesh elements to define mesh openings there between.

16. The lawn rake of claim 14 wherein the rear boundary panel includes a concave curvature about the longitudinal axis of the capture structure, the concave curvature facing in the raking direction when the lawn rake is in the rake operating position.

\* \* \* \* \*